United States Patent [19]
Elser et al.

[11] Patent Number: 5,839,527
[45] Date of Patent: Nov. 24, 1998

[54] MULTI-AXLE STEERING SYSTEM FOR VEHICLES

[75] Inventors: Dieter Elser, Essingen; Klaus Rief, Leinzell, both of Germany

[73] Assignee: ZF Friedrichshafen AG., Friedrichshafen, Germany

[21] Appl. No.: 727,528
[22] PCT Filed: Apr. 15, 1995
[86] PCT No.: PCT/EP95/01417
  § 371 Date: Oct. 21, 1996
  § 102(e) Date: Oct. 21, 1996
[87] PCT Pub. No.: WO95/29087
  PCT Pub. Date: Nov. 2, 1995

[30] Foreign Application Priority Data
  Apr. 22, 1994 [DE] Germany .......... 44 14 161.0
[51] Int. Cl.⁶ .......... B62D 7/00
[52] U.S. Cl. .......... 180/24.01; 91/399
[58] Field of Search .......... 180/24.01, 414; 280/91.1; 91/399, 437

[56] References Cited

U.S. PATENT DOCUMENTS

| | | | |
|---|---|---|---|
| 2,735,502 | 2/1956 | Muller | 180/417 |
| 4,591,177 | 5/1986 | Perlini | 180/24.01 |
| 4,887,632 | 12/1989 | Tanaka et al. | 180/414 |
| 5,092,419 | 3/1992 | Leiber et al. | 180/414 |

FOREIGN PATENT DOCUMENTS

| | | |
|---|---|---|
| 150520 | 8/1985 | European Pat. Off. |
| 37 20 273 | 6/1987 | Germany |

*Primary Examiner*—Kevin Hurley
*Attorney, Agent, or Firm*—Larson & Taylor

[57] ABSTRACT

A multi-axle steering system which is intended for vehicles has a steering gear (4) for a first steering axle (1) and hydrostatic steering for a second steering axle (2). A master cylinder (11) is disposed on the first steering axle (1) and a slave cylinder (23) on the second steering axle (2). The work chambers (12, 13; 24, 25) of the master cylinder (11) and the slave cylinder (23) are connected with each other by pressure lines (26, 27) and in this way together constitute the hydrostatic steering. A centering device (34) for a return of the steered wheels of the second steering axle (2) into their straight-ahead running position is provided on the second steering axle (2). A device (38) on the master cylinder (11) is used for automatic synchronization of the steered wheels of the first steering axle (1) and the second steering axle (2), by means of which a connection can be made only between the two work chambers (12, 13) of the master cylinder (11) in the straight-ahead running position and an adjacent small area.

15 Claims, 3 Drawing Sheets

MULTI-AXLE STEERING SYSTEM FOR VEHICLES

BACKGROUND OF THE INVENTION

1. Field of the Invention

The invention relates to a multi-axle steering system for vehicles. The steering system includes a steering gear for a first steering axle and hydrostatic steering for a second steering axle, wherein a master cylinder is disposed on the first steering axle and a slave cylinder is disposed on the the second steering axle, whose work chambers are connected with each other by means of pressure lines and which together constitute the hydrostatic steering, and wherein the second steering axle has a centering device to return of the steered wheels of the second steering axle into their straight-ahead running position.

2. Description of the Prior Art

This type of multi-axle steering system is known from European Patent Publication EP 0 150 520 B1. This multi-axle steering system is intended for a vehicle with three axles. The front axle and the second rear axle of these three axles are designed to be steerable. The known multi-axle steering system has an automatic stabilizer for the straight-ahead running position of the rear steering axle. To stabilize the straight-ahead running position of the rear steering axle, a fluid connection with a reservoir is made at or near the center position of the front steering axle, by means of which pressure relief of a hydraulic cylinder disposed on the front axle is achieved when it is in the center position. It is disadvantageous in connection with this multi-axle steering system that after each passage through the center position it is necessary to build up the pressure from zero in the hydraulic cylinder acting as the master cylinder for the hydrostatic steering.

It is the object of the invention to improve a multi-axle steering system for vehicles of the known type in such a way that the mentioned disadvantages are avoided, in particular in that pressure losses and therefore energy losses are prevented as much as possible and satisfactory synchronization of the two steering axles is assured.

SUMMARY OF THE INVENTION

This object is attained by the multi-axle steering system The attainment is achieved in that a device for the automatic synchronization of the movements of the master cylinder and the slave cylinder is provided on the master cylinder, by means of which a connection between only the two work chambers of the master cylinder can be made in the straight-ahead running position and in a small area adjoining it.

Practical and advantageous embodiments of the invention are described in the detailed description herein. However, the invention is not limited to the combination of the specific characteristics of the preferred embodiments. Further useful combination options of the preferred embodiments and individual preferred embodiments result from the object of the invention for one skilled in the art.

The device for synchronizing is formed in a particularly advantageous and simple manner in a guide insert of the piston rod of the master cylinder by means of an elastic seal ring, which is maintained in an annular groove of the guide insert, which is radially open to the outside. The seal ring acts together with a ring-shaped contraction of the piston rod in such a way that in the straight-ahead running position and in an area adjoining it between the seal ring and the constriction, there is a connection between the work chambers of the master cylinder, and that outside of this area the seal ring rests sealingly against the cylindrical portion of the piston rod so that the two work chambers are separated from each other in this way.

In this embodiment a direct connection between the two work chambers of the master cylinder and a reservoir is not possible in the straight-ahead running position. There is only a connection between the two work chambers of the master cylinder, so that there can be no pressure build-up in the work chambers of the slave cylinder and the second steering axle remains centered in its straight-ahead running position. In this way the synchronization of the slave cylinder with the master cylinder is assured during each passage of the master cylinder through the straight-ahead running position.

The length of the area of the straight-ahead running position, in which a pressure build-up in the slave cylinder is intended to be prevented, can be easily established by the length of the constriction of the piston rod, in that the length of its cylindrical area and/or the length and inclination of the transition to the full exterior diameter of the piston rod are varied.

Two compensation valves are disposed between the two work chambers of the master cylinder or the slave cylinder, only one of which can be closed at one time. The backs of the compensation cylinders facing away from the work chambers are connected to a pressure reservoir. By means of this it is achieved that the system pressure can be maintained approximately constant during temperature changes, i.e. for example no pressure increase takes place with a temperature increase. It is furthermore possible to pre-stress the hydrostatic steering system by means of the pressure reservoir connected with it. The stiffness of the system is assisted by this.

It is particularly advantageous to design the two compensation valves as ball seat valves having two valve seats facing away from each other and arranged coaxially in respect to each other. The distance between the valve seats is fixed in such a way that the valve balls touch each other before one of the ball valves rests on one of the valve seats. It is assured by means of this that only respectively one of the compensation valves can be closed. The two compensation valves can be disposed in a particularly space-saving manner in the guide insert.

Two pressure relief valves, which are advantageous for the two sides of the hydrostatic steering, can also be disposed in the guide insert.

If the centering device of the second steering axle is embodied as a hydraulic cylinder-piston unit which is connected with the pressure reservoir, this results in a simple manner in a centering device whose centering power can be adjusted by means of the pressure of the pressure reservoir.

The invention will be explained in more detail in what follows by means of two exemplary embodiments represented in the drawings.

DETAILED DESCRIPTION OF THE PREFERRED EMBODIMENTS

Figure 1:
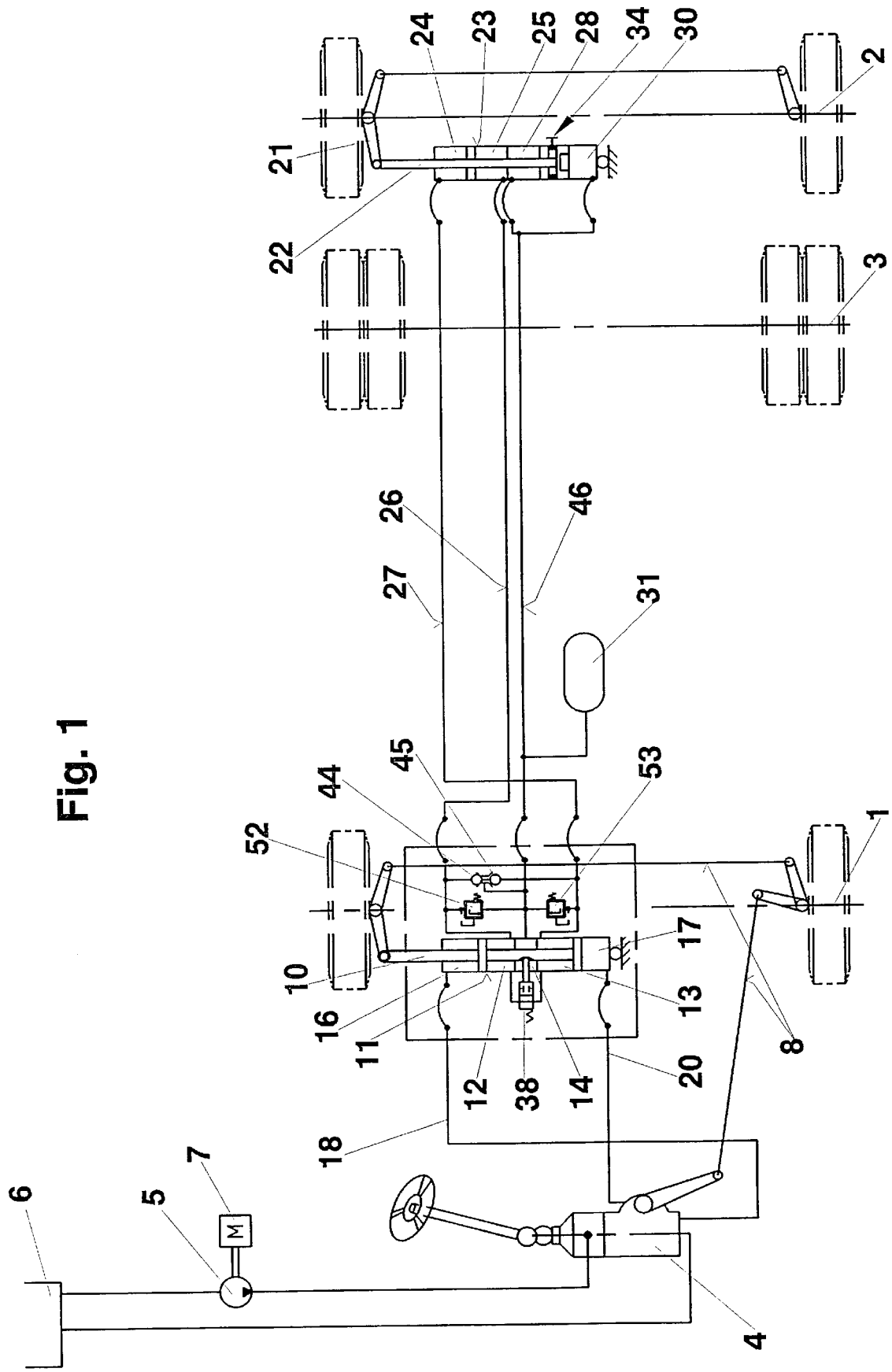
FIG. 1 represents a schematic representation of a hydraulic circuit diagram of the multi-axle steering system in accordance with the invention in a first exemplary embodiment, with a master cylinder on a first steering axle and a slave cylinder on a second steering axle.

The multi-axle steering system in accordance with the invention is intended, for example, for a vehicle with three axles, of which a first steering axle 1 is embodied as a steerable front axle of the vehicle, and a second steering axle 2 is arranged as a steerable trailing axle behind a rigid rear axle 3 of the vehicle. The first steering axle 1 is controlled by a steering gear 4. The steering gear 4 is embodied as a power-assisted steering which is connected with a servo pump 5 and a reservoir 6. The servo pump 5 is usefully driven by the vehicle engine 7. The embodiment of the steering gear 4 is not essential for the invention and will therefore not be described in detail. In place of a power-assisted steering it is also possible to provide manual steering, for example for smaller, lighter vehicles. With both power-assisted steering and manual steering there is usefully a mechanical connection from the steering gear 4 to the first steering axle 1 via a steering linkage 8.

A piston rod 10 of a master cylinder 11 is connected with the steering linkage 8. The master cylinder 11 contains two pressure chambers 12 and 13, between which a guide insert 14 with a centered, essentially cylindrical opening 15 for the piston rod 10 is located. If, as in FIG. 1, the steering gear 4 is designed as a power-assisted steering, two further work chambers 16 and 17, which are used for the power assist of the steering movements of the first steering axle 1, follow the two work chambers 12 and 13 of the actual master cylinder 11. These two work chambers 16 and 17 are connected with the steering gear 4 via work lines 18 and 20.

A piston rod 22 of a slave cylinder 23 is connected with a steering linkage 21 of the second steering axle 2. The slave cylinder 23 has two work chambers 24 and 25, which are connected via lines 26 and 27 with the work chambers 12 and 13 of the master cylinder 11. Together with the lines 26 and 27, the master cylinder 11 and the slave cylinder 23 constitute a hydrostatic steering of the second steering axle 2.

The slave cylinder 23 contains two further work chambers 28 and 30, which are both connected with a pressure reservoir 31. Together with two pistons 32 and 33, which are floatingly seated in the slave cylinder, the two work chambers 28 and 30 constitute a centering device 34 for a return of the steered wheels of the second steering axle 2 into the straight-ahead running position. By means of the reservoir pressure existing in the work chambers 28 and 30, the two pistons 32 and 33 push the piston rod 22 via a spring washer 35, fastened at its end, in the direction toward a central stop formed by a spring washer 36 fixed in place in the slave cylinder 23. An air-filled space 37 is located between the two pistons 32 and 33, in which a partial vacuum exists when the second steering axle 2 is deflected.

A device 38 for the automatic synchronization of the movements of the master cylinder 11 and the slave cylinder 23 is provided on the master cylinder 11, usefully in the guide insert 14. The device 38 is formed by an elastic seal ring 39 which is held in an annular groove 40 in the guide insert 14, radially open toward the interior in the direction toward the opening 15. The seal ring 39 works together with a ring-shaped constriction 41 of the piston rod 10. In its center the constriction 41 has a cylindrical area, which is followed on both sides by a transition area up to the full exterior diameter of the piston rod 10. In the straight-ahead running position of the vehicle wheels of the first steering axle 1 which are to be steered, the constriction 41 is located in the area of the seal ring 39. An annular gap exists between the seal ring 39 and the cylindrical area of the constriction 41 in the straight-ahead running position, through which, together with two axial grooves 42 and 43, an open connection between the two work chambers 12 and 13 of the master cylinder 11 is provided. The two axial grooves 42 and 43 are formed in the interior of the opening 15 and are open toward both sides of the guide insert 14. The transition from the cylindrical area of the constriction 41 to the full exterior diameter of the piston rod 10 usefully consists of faces of a truncated cone with a very small inclination, so that, when the piston rod 10 is displaced, the seal ring 39 can continuously expand until it finally rests sealingly on the cylindrical exterior of the piston rod 10 and during the further movement of the piston rod 10 completely blocks the connection between the two work chambers 12 and 13 in this way.

The length of the effective constriction 41 determines the steering angle of the first steering axle 1 within which the second steering axle 2 remains hydraulically centered and does not also steer. The device 38 for synchronization is sealed outside of the area of the constriction 41. In this case the hydrostatic connection between the first steering axle 1 and the second steering axle 2 is active. This means that adjustment forces in connection with higher pressures act on the second steering axle 2. If leaks in the hydrostatic system occur in this phase, the association of the slave cylinder 23 with the master cylinder 11 is changed. This change is compensated every time the constriction 41 is crossed, i.e. a synchronization is performed. In this embodiment of the device 38 it is important that the effective piston faces of the work chambers 12, 13 of the master cylinder 11 are of the same size. Unequal faces would lead to a hydraulic blockage during synchronization. The slave cylinder 23 also has equal piston surfaces.

Figure 3:
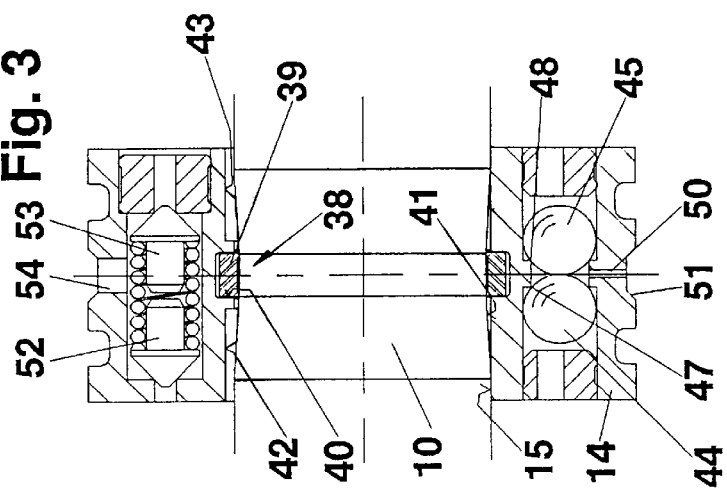
FIG. 3 is a longitudinal section through a guide insert of the master cylinder in FIG. 2.
Figure 2:
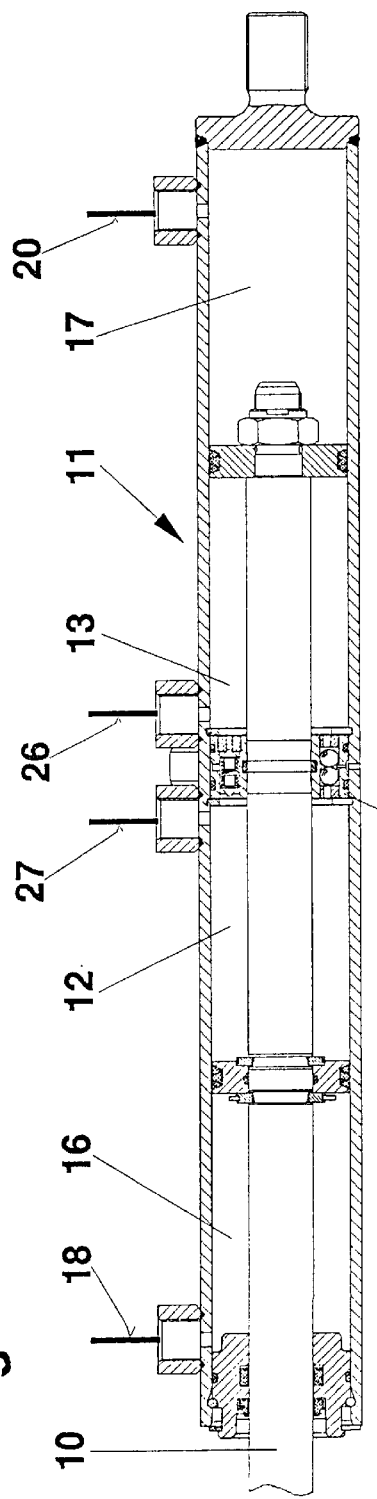
FIG. 2 is a longitudinal section through a structural embodiment of the master cylinder.
Figure 4:
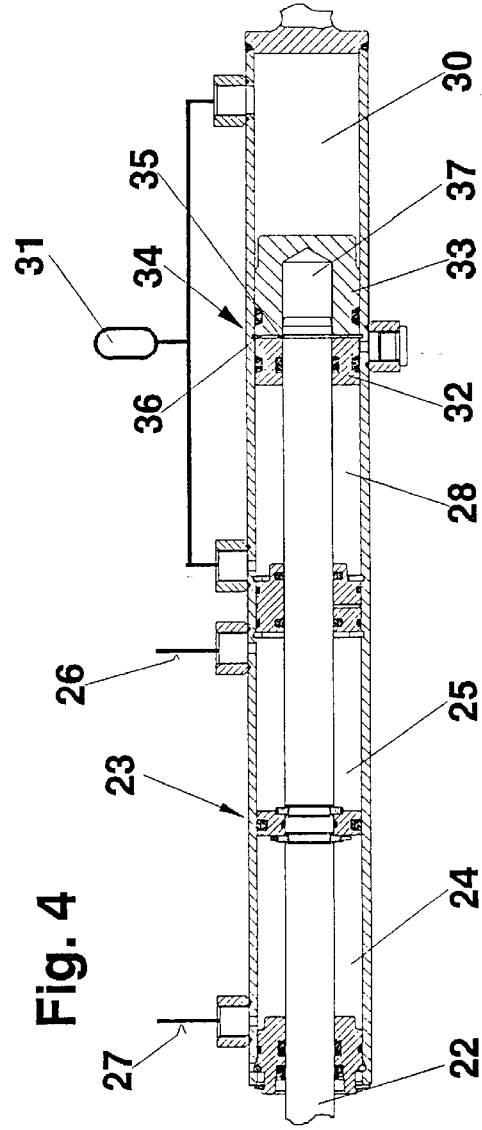
FIG. 4 is a longitudinal section through a structural embodiment of the slave cylinder.

To prevent the appearance of a pressure increase when the temperature of the multi-axis steering system rises, compensating valves 44 and 45 are disposed between each work chamber of the master cylinder 11 or the slave cylinder 23 on the one side and the pressure reservoir 31 on the other side. In the schematic exemplary embodiment of FIG. 1, the compensating valves 44 and 45 are disposed between the two lines 26 and 27 on the one side and a line 46 leading to the pressure reservoir 31 on the other side. The two compensating valves 44 and 45 are integrated into the guide insert 14 in the structural embodiment of FIG. 3. In this case they are designed as ball seat valves and have two valve seats 47 and 48, which face away from each other and are arranged coaxially in respect to each other. The distance between the valve seats 47 and 48 is fixed in such a way that the valve balls touch before one of the valve balls comes to rest on one of the valve seats 47 and 48. A bore 50 is located between the two valve seats 47 and 48, which leads to an annular groove 51 with which the pressure reservoir 31 is connected. By means of the fixed distance between the two valve seats 47 and 48 it is achieved that respectively only one work chamber 12 or 13 can be connected with the pressure reservoir 31 via the bore 50, while the other work chamber 13 or 12 is separated from the pressure reservoir 31. A connection between the two work chambers 12 and 13 via the compensating valves 44 and 45 is therefore also not possible.

To limit the working pressure in the hydrostatic steering, a pressure relief valve 52 or 53 is provided for each side of this steering. In the exemplary embodiment of FIG. 1, these pressure relief valves 52 and 53 have been inserted between the lines 26 and 27 on the one side and the line 46 leading to the pressure reservoir 31. In the exemplary embodiment in FIG. 3, the pressure relief valves 52 and 53, together with the compensating valves 44 and 45, are disposed in the guide insert 14. Here, too, the side of the pressure relief valves 52 and 53 facing away from the pressure is connected with the pressure reservoir 31 via a bore 54 and the annular groove 51.

Figure 5:
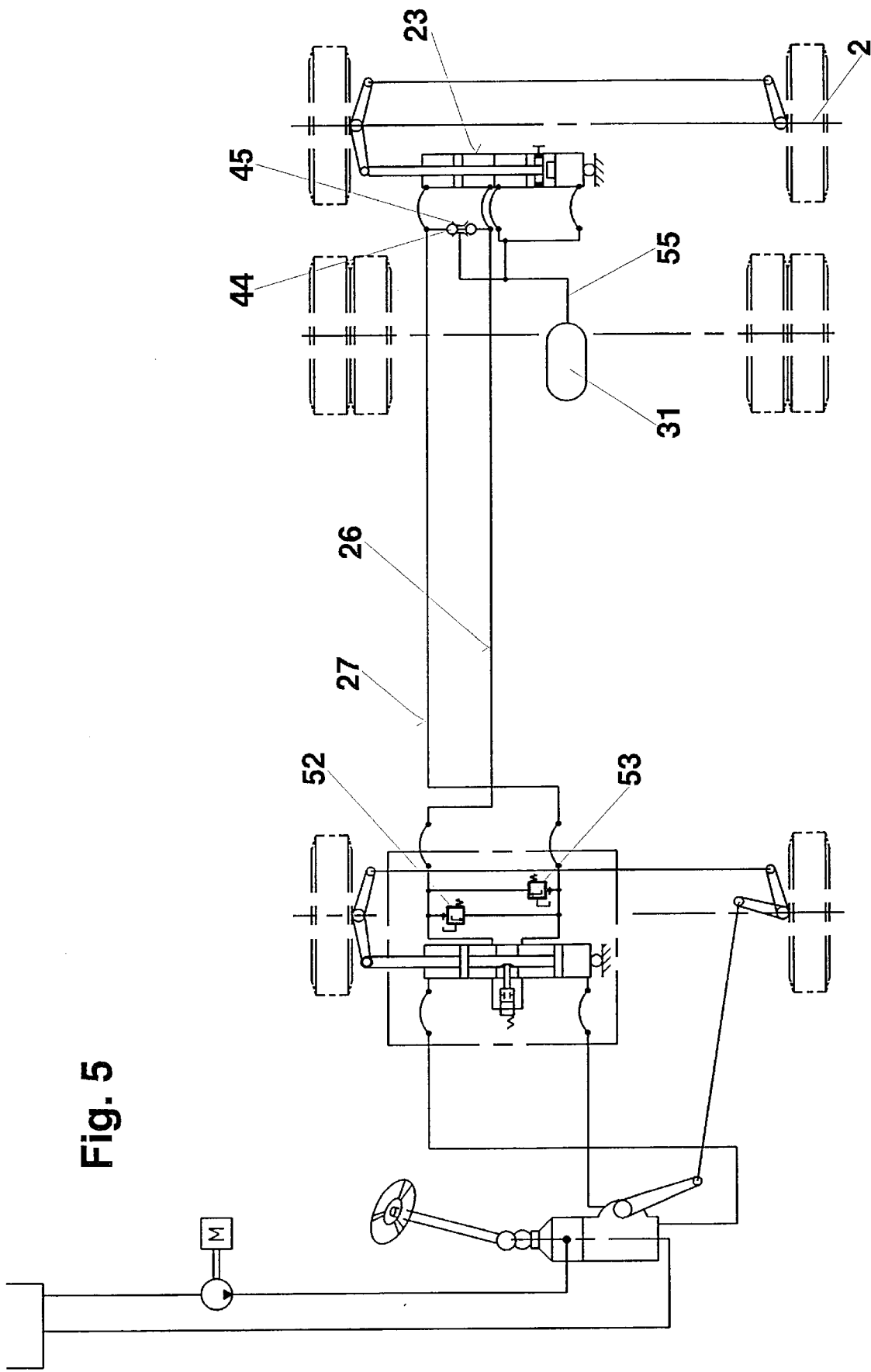
FIG. 5 is a hydraulic circuit diagram of the multi-axle steering system in accordance with the invention in a second exemplary embodiment.

In the exemplary embodiment of FIG. 5 the compensating valves 44 and 45 and the pressure reservoir 31 are disposed in the direct vicinity of the slave cylinder 23 of the second steering axle 2. Similar to the exemplary embodiment in FIG. 1, the two compensating valves 44 and 45 have been inserted between the two lines 26 and 27 on the one side and a line 55 leading to the pressure reservoir 31 on the other side. The advantage of this arrangement lies in that the long line 46 from the front to the back, which is required in the exemplary embodiment of FIG. 1, can be omitted. The pressure relief valves 52 and 53 are arranged in such a way that the side facing away from the pressure is respectively connected with the other side of the hydrostatic steering, so that the check valve 53 connected to the line 26 opens into the line 27 and vice versa.

If the pressure of the pressure reservoir 31 is designed to be adjustable, the centering force of the centering device 34 can be adjusted by means of this.

What is claimed is:

1. A multi-axle steering system for vehicles comprising a steering gear for a first steering axle having steered wheels and with hydrostatic steering for a second steering axle having steered wheels, wherein a master cylinder having two work chambers and being disposed on the first steering axle and a slave cylinder having two work chambers and being disposed on the second steering axle, the four work chambers being connected with each other by means of pressure lines and which elements together constitute the hydrostatic steering, wherein the second steering axle has a centering device for the return of the steered wheels of the second steering axle to a straight-ahead running position, the improvement comprising the two work chambers of the master cylinder are provided with equal effective surfaces, and a device for the automatic synchronization of the movement of the master cylinder and the slave cylinder is provided on the master cylinder, by means of which device a connection between only the two work chambers of the master cylinder can be made when the steered wheels of the first steering axle are in or near the straight-ahead running position.

2. A multi-axle steering system in accordance with claim 1, wherein the master cylinder includes a piston rod and the device for synchronizing the movements of the master cylinder and the slave cylinder is formed in a guide insert of the piston rod of the master cylinder by an elastic seal ring which is maintained in an annular groove of the guide insert, the annular groove being radially open to the outside and which, together with a ring-shaped constriction of the piston rod, ensures that when the steered wheels of the first steering axle are in the straight-ahead running position there is an open connection between the work chambers of the master cylinder in an area between the seal ring and the constriction adjoining the seal ring; and that outside of the area between the seal ring and constriction adjoining the seal ring, the seal ring rests in sealing engagement against a cylindrical portion of the piston rod such that the two work chambers of the master cylinder are not connected to one another.

3. A multi-axle steering system in accordance with claim 2, wherein the constriction of the piston rod includes a central cylindrical area and adjacent the center cylindrical area of the constriction of the piston rod, the piston rod gradually increases in diameter until it reaches a maximum external diameter.

4. A multi-axle steering system in accordance with claim 1, further comprising at least two compensating valves one of which is disposed between a work chamber of the master cylinder and a fluid-containing pressure reservoir, and the other of which is disposed between a work chamber of the slave cylinder and the pressure reservoir to provide a fluid connection from the pressure reservoir to the respective work chamber via the compensating valve and wherein at least one work chamber of the master cylinder is not connected to the pressure reservoir.

5. A multi-axle steering system in accordance with claim 4, wherein the at least two compensating valves are ball seat valves.

6. A multi-axle steering system in accordance with claim 5, wherein the compensating valves are disposed in the guide insert.

7. A multi-axle steering system in accordance with claim 6, wherein the compensating valves each have two valve seats, respectively, which valve seats face away from one another and are disposed coaxially with respect to one another and the distance between the valve seats is fixed in such a way that the valve balls touch one another before one of the valve balls rests against one of the valve seats.

8. A multi-axle steering system in accordance with claim 7, wherein a bore is provided between the two valve seats of each of the compensating valves, and said bore leads to an annular groove located on an exterior circumference of the guide insert, and the pressure reservoir is fluidly connected to the annular groove.

9. A multi-axle steering system in accordance with claim 1, wherein the hydrostatic steering has two sides and each side of the hydrostatic steering is provided with a pressure relief valve.

10. A multi-axle steering system in accordance with claim 9, wherein the pressure relief valves are disposed in a guide insert.

11. A multi-axle steering system in accordance with claim 10, wherein each pressure relief valve has two sides, one of which faces toward the pressure from the hydrostatic steering and the other of which faces away from the pressure of the hydrostatic steering and is fluidly connected with the pressure reservoir.

12. A multi-axle steering system in accordance with claim 11, wherein the centering device of the second steering axle is a hydraulic cylinder-piston unit and is fluidly connected to the pressure reservoir.

13. A multi-axle steering system in accordance with claim 5, wherein the compensating valves and the pressure reservoir are disposed in the vicinity of the slave cylinder of the second steering axle such that the compensating valves are located between the pressure lines.

14. A multi-axle steering system in accordance with claim 12, wherein the compensating valves and the pressure reservoir are disposed in the vicinity of the slave cylinder of the second steering axle such that the compensating valves are located between the pressure lines.

15. A multi-axle steering system in accordance with claim 12, wherein the pressure of a fluid contained in the pressure reservoir is adjustable.

* * * * *